(12) United States Patent
Smith

(10) Patent No.: US 6,402,104 B1
(45) Date of Patent: Jun. 11, 2002

(54) SUCTION CUP-SUPPORTED BATHROOM ACCESSORY

(76) Inventor: Lee Smith, 676 S. Military Trail, Deerfield Beach, FL (US) 33442

( * ) Notice: Subject to any disclaimer, the term of this patent is extended or adjusted under 35 U.S.C. 154(b) by 0 days.

(21) Appl. No.: 09/805,835

(22) Filed: Mar. 15, 2001

(51) Int. Cl.[7] .......................... A45D 42/14; F16B 47/00
(52) U.S. Cl. ...................... 248/205.5; 403/51; 403/57; 248/205.8; 248/206.2
(58) Field of Search ........................... 248/205.5, 206.2, 248/223.41, 224.51; 211/65, 66, 706; 4/559, 605, 628; D6/528, 524, 526, 527; 403/51, 57, 229, 226, 294, 345, 363, 381

(56) References Cited

U.S. PATENT DOCUMENTS 3,750,991 A * 8/1973 Ragir ....................... 248/205.8
5,176,347 A * 1/1993 Rouail ...................... 248/206.2
6,244,778 B1 * 6/2001 Chesbrough ................. 403/51

* cited by examiner

*Primary Examiner*—Leslie A. Braun
*Assistant Examiner*—Deborah M. Brann
(74) *Attorney, Agent, or Firm*—Myron Amer P.C.

(57) ABSTRACT

A selected one of several bathroom accessories each having a different utilitarian front, such as a toothbrush holder, soap dish or the like, and a common uniform T-shape base which tracks in a T-shape recess of a suction cup support, wherein a position of movement of a crank which operates the suction cup is used to advantage to contribute to facilitating the attaching and detaching of the T-shape base and recess, and their uniform configuration results in interchangeability therebetween.

1 Claim, 2 Drawing Sheets

SUCTION CUP-SUPPORTED BATHROOM ACCESSORY

The present invention contributes to the convenience in the use of bathroom accessories such as a toothbrush holder, a soap dish, a wash cloth support, grooming aids such as a hair brush, curling iron and like sundries, wherein the convenience consists of providing during a most opportune circumstance such as for a family during a vacation, a salesperson at a trade convention, an option to arrange the aforementioned sundries in an orderly fashion rather than in a clutter as is now typically the case. More particularly, the present invention relates generally to advantageous use of a known suction cup to achieve a readily established orderly arrangement of the accessories about a bathroom sink at the site of the vacation or trade convention, as a substitute for the accessories being cluttered about the sink or stored all together in a bag or similar common container.

EXAMPLE OF THE PRIOR ART

Suction cups which attach to tile surfaces which typically frame a medicine storage compartment mirror over a bathroom sink, are already well known as exemplified by U.S. Pat. No. 3,750,991 for "Suction Mounting Device" issued to Ragir on Aug. 7, 1973. The '991 suction cup suggests itself for use with a rearwardly extending hook on which to hang a wash cloth or towel or as a front of an integral unitary construction with a soap dish or other singular selected bathroom accessory from the list of the sundries previously mentioned. This known one-to-one suction cup and accessory relation contributes to the user's convenience in the use of the accessory but is of a limited nature unless a suction cup support is provided for each accessory.

Broadly, it is an object of the present invention to overcome the foregoing and other shortcomings of the prior art.

More particularly, it is an object to provide a modified suction cup constructed for conjoint use with plural accessories, optionally selected for support one at a time on the suction cup thereby obviating the need for more than one or possibly perhaps two suction cup supports, while making accessible for convenient use many more in number of the accessories. However, even if the user chooses to use the same number of suction cups and accessories, the interconnection is interchangeable so that the suction cups and particular accessories do not have to be tediously matched with each other, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

Figure 1:
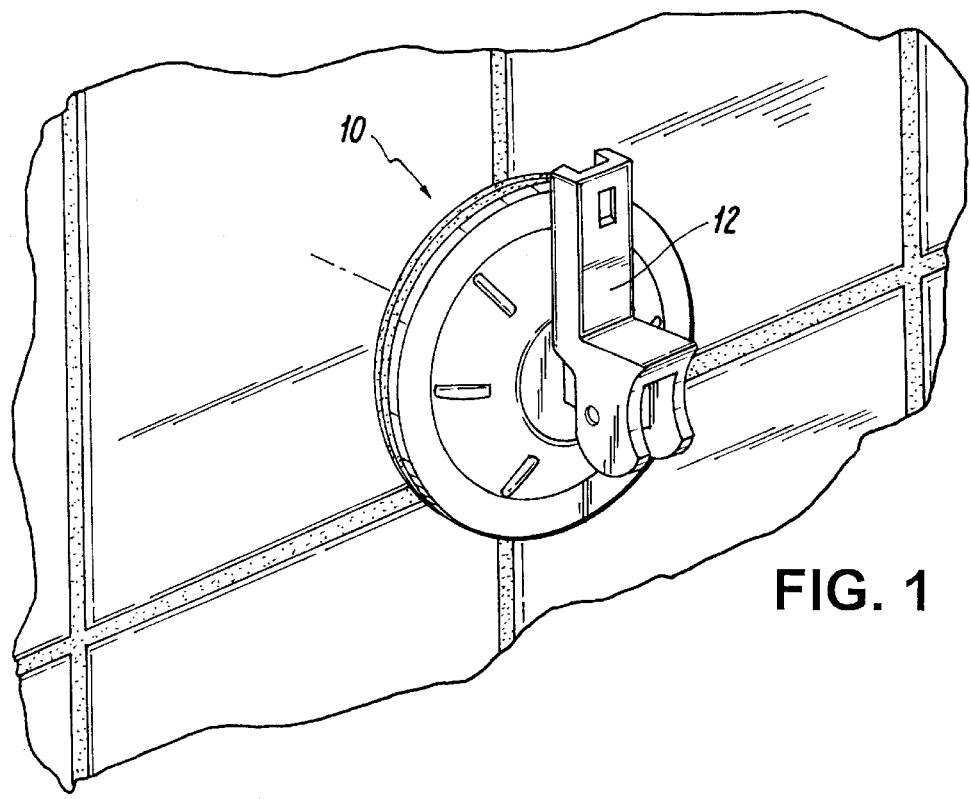
FIG. 1 is a perspective view of a suction cup component used in accordance with the present invention in its starting condition preparatory to its operating mode resulting in its attachment, under a vacuum, to a support surface.
Figure 2:
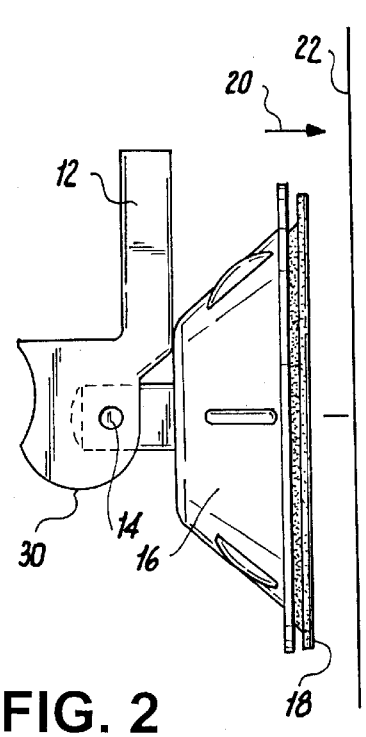
FIGS. 2 and 3 are side elevational views of the suction cup of FIG. 1 illustrating in sequence the operating mode thereof.
Figure 3:
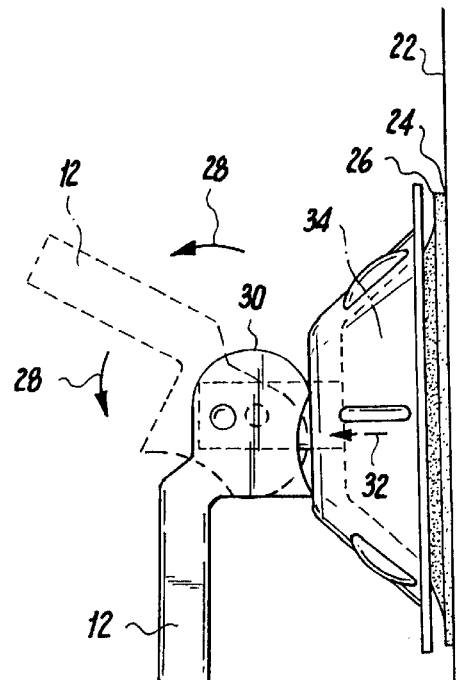
Figure 4:
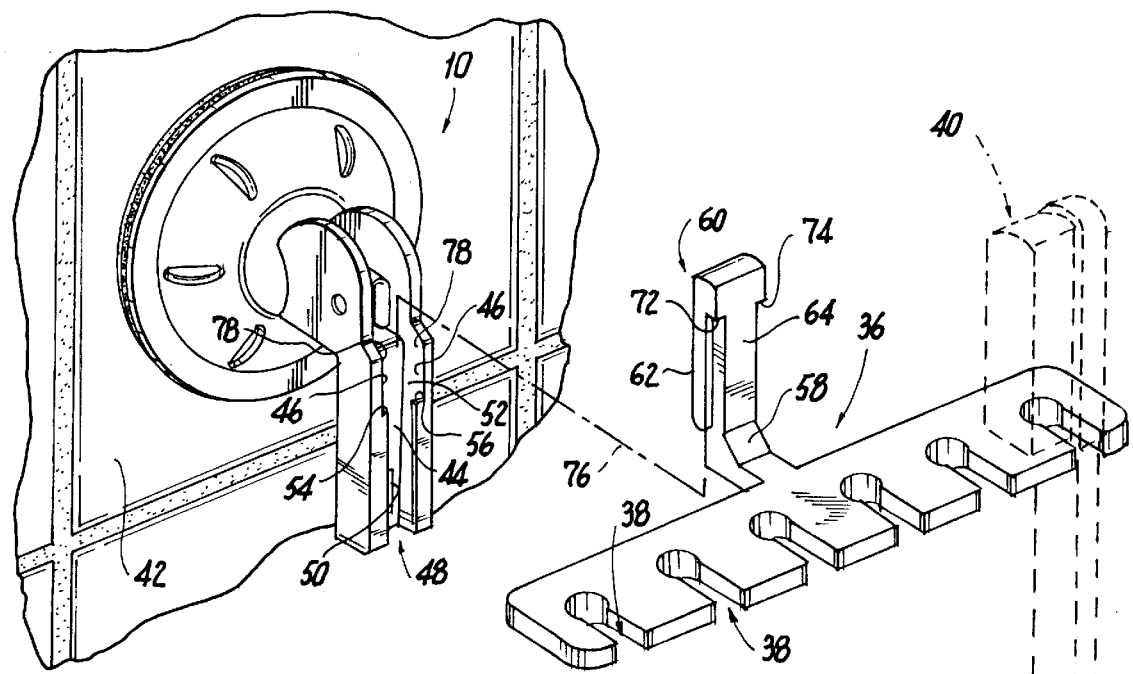
FIG. 4 is a perspective view of the suction cup in its attached relation to a support surface and preparatory to the attachment thereto of an illustrated accessory.
Figure 5:
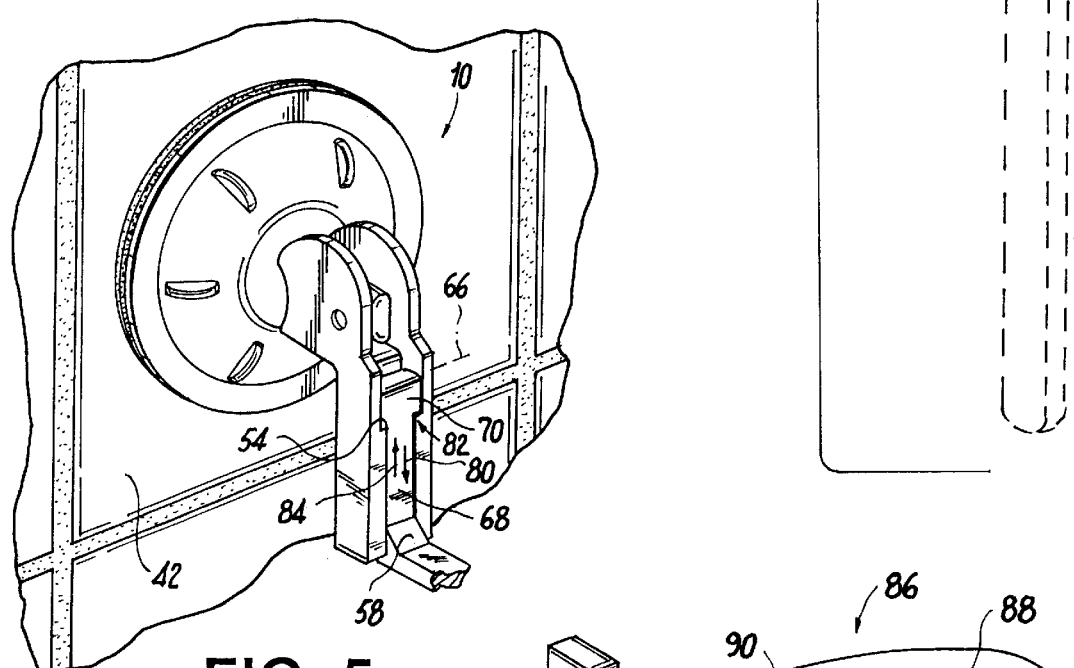
FIG. 5 is a partial perspective view illustrating details of the suction cup and attached accessory of FIG. 4.
Figure 6:
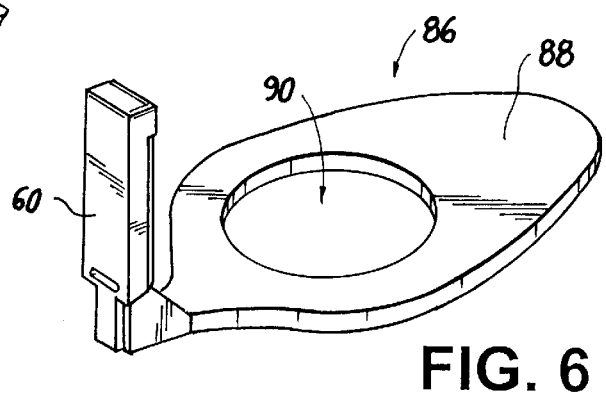
FIG. 6 is a perspective view of another accessory contemplated for attachment to the suction cup.

FIGS. 1–3 focus on the construction and on the operating mode of a suction cup, generally designated 10, both of which are per se well known and thus are not part of the present invention except, it is important to note, that the known operating mode of the suction cup 10 is used to advantage to achieve the present invention.

More particularly, suction cup 10 has a crank 12 pinned, as at 14, centrally to circular disc 16 appropriately attached to a larger diameter circular rubber disc 18 which is pressed, with the crank 12 in a vertical orientation as illustrated, in the direction 20 against a support surface 22 which establishes an airtight seal at the interface, as noted at 24, between a peripheral edge 26 of the rubber disc and support surface 22. The crank 12 urged through a pivotal traverse 28 assumes positions of movement from a starting upwardly pointed condition (FIG. 2), an intermediate condition illustrated in phantom perspective and a final downwardly full line illustrated pointed condition (FIG. 3), through 180 degrees and in which final condition the crank 12 is in a vertical orientation.

During the 180 degree pivotal transverse, a cam surface 30 on the distal end of the crank, in a known manner, withdraws, as noted at 32, the center of the rubber disc in a clearance position from the support surface 22 while the airtight seal is maintained at 24, with the result that a vacuum is created in the area 34 bounded by the then cup-shaped rubber disc 18, and this created vacuum is effective to hold the suction cup 18 attached to the support surface 22 to an extent as to be capable to support a modest weight of accessories attached to the suction cup crank 12.

In accordance with the present invention, one such accessory with the requisite weight that in practice has been used as intended, is a plastic toothbrush holder 36 having notches, individually and collectively designated 38, for individual family members' toothbrushes 40, as illustrated in phantom perspective, readily attachable to and detachable from the holder 36, which in a typical use would be attached under vacuum using the suction cup 10 pressed against a bathroom tile 42 having a preferred smooth surface for establishing a vacuum, and an opportune occasion for doing so being a family vacation.

Underlying the present invention is the recognition that the vertical orientation of the crank 12 contributes to an interconnection thereto using to advantage descending tracking movement and disengaging therefrom using reverse ascending movement, also under controlled tracking conditions. To this end, the rear surface 44 of the crank 12 presented in an outwardly facing relation to a user is molded or otherwise appropriated configured with walls 46 bounding a T-shape recess, generally designated 48, consisting of a vertical length portion or leg 50 of the T-shape recess, at the junction of which leg 50 and top 52, there are formed opposite left 54 and right 56 shoulders, serving as stop abutments for structure tracking in the track or leg recess 50.

Cooperating with the T-shape recess 48 of the crank 12 is an integral rearward extension 58 from the accessory 36 having the utilitarian toothbrush-holding front, and on the extension 58 in facing relation to the suction cup crank 12 is a base 60 of a thickness delimited by a rear surface 62 and a front surface 64. In the molding of the base 60 the thickness 66 thereof is configured with a matching T-shape as a front surface projection having a leg 68 and a transverse top 70, and at the junction of the leg 68 and top 70, there are formed opposite left 72 and right 74 abutment surfaces.

Thus, the cooperation referred to between the T-shape recess 48 and matching shaped projection 58 is in the nature of female and male connecting means.

In use, the accessory 36 is positioned, as noted by the movement arrow 76, so as to establish alignment between the base 60 with the opening 78 into the crank recess 48 and then urged through descending movement 80 until contact, as at 82, between the crank shoulders 54, 56 and accessory abutment surfaces 72, 74. Removal of the accessory 36 from its suction cup support is readily achieved by reverse ascending movement 84.

The present invention contemplates the use of multiple combination sets of suction cups 10 and accessories 36, or one suction cup 10 and plural accessories 36. For example, a separate or the same suction cup could be used for a hairbrush holder 86 having a similarly constructed base 60 as previously described, and a utilitarian different front 88 with an opening 90 sized to receive a handle of a hairbrush (not shown). Other contemplated accessories (not shown) are a washcloth holder, a soap dish, and like accessories typically used in the environment of a bathroom sink.

While the suction cup-supported selected bathroom accessory herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. For use in combination with a known vacuum-attached suction cup of a type having an operative position mounted to a vertically oriented support surface and in the operational mode of which a pivotally mounted crank is urged from an upwardly pointed position through a 180 degree pivotal traverse into a downwardly pointed position, said suction cup comprising a T-shape arrangement of walls in said crank bounding a recess delimiting a vertical track in said leg of said T-shape and a transverse notch in a top of said T-shape opening into said track and at an opening junction providing abutment-contacting surface stops, a bathroom accessory having a free end with a selected utility when in supported relation on said suction cup, said accessory comprising a base, and a matching T-shape projection on said base having an operative position with a leg of said T-shape slidably disposed for tracking in said vertical track incident to providing a descending degree of movement until abutment of a top of said T-shape with said abutment-contacting surface stops, whereby said accessory is supported for use on said suction cup and readily removable for substitution by another accessory incident to an ascending degree of movement off of said abutment-contacting surface stops.

* * * * *